(12) United States Patent
Dabrowski et al.

(10) Patent No.: US 7,307,823 B2
(45) Date of Patent: Dec. 11, 2007

(54) MODULAR SURGE SUPPRESSOR SYSTEM AND SURGE SUPPRESSOR MODULE

(75) Inventors: Henryk J. Dabrowski, Calgary (CA); Anthony-Cernan Mendoza, Calgary (CA); James Funke, Calgary (CA); John D. Towler, Calgary (CA); Dalibor Kladar, Calgary (CA); Mieczyslaw Bandura, Calgary (CA); David J. Speidelsbach, Cranberry Township, PA (US)

(73) Assignee: Eaton Corporation, Cleveland, OH (US)

( * ) Notice: Subject to any disclaimer, the term of this patent is extended or adjusted under 35 U.S.C. 154(b) by 834 days.

(21) Appl. No.: 10/443,431

(22) Filed: May 22, 2003

(65) Prior Publication Data

US 2004/0233605 A1   Nov. 25, 2004

(51) Int. Cl.
*H01C 7/12* (2006.01)
(52) U.S. Cl. .................................................... 361/118
(58) Field of Classification Search ............... 361/118; D13/160
See application file for complete search history.

(56) References Cited

U.S. PATENT DOCUMENTS

| | | | |
|---|---|---|---|
| 3,689,864 A * | 9/1972 | Glader ........................ 439/97 |
| 5,414,584 A * | 5/1995 | Young ........................ 361/115 |
| 5,606,299 A | 2/1997 | Innes et al. | |
| D382,855 S | 8/1997 | Salmond et al. | |
| 5,748,424 A * | 5/1998 | Hung .......................... 361/56 |
| 5,788,521 A | 8/1998 | Milan | |
| 5,969,932 A | 10/1999 | Ryan et al. | |
| 5,986,870 A * | 11/1999 | Kapp ......................... 361/127 |
| 6,118,643 A | 9/2000 | Dyer et al. | |
| 6,304,188 B1 | 10/2001 | Subak et al. | |
| 2002/0067593 A1* | 6/2002 | Milan ........................ 361/686 |

\* cited by examiner

*Primary Examiner*—Michael Sherry
*Assistant Examiner*—Scott Bauer
(74) *Attorney, Agent, or Firm*—Martin J. Moran (57) ABSTRACT

A surge suppressor module includes a power conductor, a ground conductor, and a housing including an opening and a plurality of dovetail groove mechanisms and arcuate ground bus bars for electrically and mechanically mounting a corresponding surge suppressor module. An alternating current surge suppressor circuit is housed by the housing. The circuit receives the power and ground conductors through the opening of the housing. The circuit electrically connects the ground conductor to the plurality of arcuate ground bus bars for electrically and mechanically mounting a corresponding surge suppressor module, in order to provide a common ground connection thereto.

14 Claims, 11 Drawing Sheets

MODULAR SURGE SUPPRESSOR SYSTEM AND SURGE SUPPRESSOR MODULE

BACKGROUND OF THE INVENTION

1. Field of the Invention

The invention relates to surge suppressors and, more particularly, to modular surge suppressor systems and modules for protecting electrical equipment connected to, for example, a residential alternating current (AC) power line, a telephone line, a cable television line, or a satellite receiver.

2. Background Information

Surge suppressors are voltage clamping devices, which are employed to protect a load, such as, for example, appliances, computers and other electrical equipment, from external surge sources. Such surge suppressors also protect such electrical equipment from internal surge sources (e.g., downstream of a panel board), which result from other equipment (e.g., resulting from motor switching, or operation of a switch to disconnect a load). The surge suppressors, thus, protect a load from both external disturbances (e.g., lightning voltage remnants) and internal disturbances (e.g., caused by other equipment).

Different kinds of surge suppressors have been developed for protecting alternating current (AC)-connected, telephone-connected, and cable-connected equipment. However, for effective operation, the surge suppressor must be connected as close as possible to the source of the disturbance. For a residential application, this location is the panel board, which houses the circuit breakers that distribute power throughout the residence. For new construction, the entrance for cable lines and telephone lines may be located relatively close to the panel board.

It is known to provide a series connection of a plurality of modular surge suppressors including a power distribution module followed by one or more coaxial connector based modules and one or more communication based modules. See, for example, U.S. Pat. No. Des. 382,855; U.S. Pat. Nos. 5,788,521; and 6,118,643.

In residential installations, the panel board typically includes a plurality of cables and wires, which may obstruct the mounting of a surge suppressor therein.

Under the UL Standard for Transient Voltage Surge Suppressors, UL 1449, second edition, the interrupt current rating of a surge suppression device must be greater than or equal to the interrupt current rating of the corresponding circuit breaker or panel board. This means that an explosive force, which occurs during a double continuous overvoltage, must be contained by the surge suppression device, in order to prevent fire and injury. During such an overvoltage, the voltage sensitive device (e.g., metal oxide varistor (MOV); gas tube; semiconductor clamping device) reacts violently as its impedance becomes lower in order to shunt the power line to ground. In this situation, ionized gas rapidly develops and is pressurized within the enclosure of the surge suppression device. Accordingly, such enclosure must be able to withstand that pressure. Although the corresponding circuit breaker will trip in order to interrupt the power circuit associated with the surge suppression device, the circuit breaker will typically not trip fast enough in order to prevent the failure of the voltage sensitive device.

Although residential circuit breakers and panel boards are typically rated at about 10 kA to about 22 kA interrupt current rating, the alternating current power source (e.g., the incoming AC power line to the residence) may have a relatively higher current rating. A fault condition may occur during an improper installation with an erroneous wiring connection of two power lines (e.g., 240 VAC line-to-line) to the line and neutral conductors of the surge suppression device (e.g., designed for operation at 120 VAC nominal). This is because the surge suppression device typically employs a voltage sensitive device (e.g., MOV) having a significantly lower voltage rating (e.g., 150 VAC). Although a relatively higher voltage MOV could be employed, that would increase the clamping voltage. Also, when there is a surge, the protected electrical equipment would be exposed to relatively higher voltages and, thus, may be damaged.

Another event that may trigger a catastrophic reaction in the surge suppression device is when the power line voltage significantly increases above its nominal value (e.g., due to capacitor switching; due to a lightening strike; due to a fault on the electric utility power line).

There is room for improvement in applications of a plurality of surge suppression devices.

There is also room for improvement in the response of surge suppression devices to catastrophic wiring faults and power line fault conditions.

SUMMARY OF THE INVENTION

These needs and others are met by the present invention, which provides a surge suppressor module including a plurality of means for electrically and mechanically mounting a corresponding surge suppressor module, in order to provide a common ground connection thereto. The surge suppressor module may include a housing having a base with a plurality of sides forming an exterior wall having a first thickness. The base may include an interior wall having a second thickness, with the interior wall separating a surge suppressor circuit from the exterior wall, in order that the interior wall absorbs pressure generated during a fault to the surge suppressor circuit. The housing may include a cover having a surface with a plurality of elongated openings and a barrier affixed to a portion of the surface apart from the elongated openings, in order to act as a pressure relief valve during a fault to the surge suppressor circuit. The housing may include a barrier having a plurality of perforations proximate the elongated openings of the surface of the cover.

As one aspect of the invention, a surge suppressor module comprises: a power conductor; a ground conductor; a housing including an opening and a plurality of means for electrically and mechanically mounting a corresponding surge suppressor module; and an alternating current surge suppressor circuit housed by the housing, the circuit receiving the power and ground conductors through the opening of the housing, the circuit electrically connecting the ground conductor to the plurality of means for electrically and mechanically mounting a corresponding surge suppressor module, in order to provide a common ground connection thereto.

As another aspect of the invention, a modular surge suppressor system comprises: a first alternating current surge suppressor module comprising: a power conductor, a ground conductor, a first housing including an opening, a plurality of sides and a plurality of means for electrically and mechanically mounting a corresponding surge suppressor module, and a first alternating current surge suppressor circuit housed by the first housing, the circuit receiving the power and ground conductors through the opening of the first housing, the circuit including a first ground and electrically connecting the ground conductor to the first ground and to the plurality of means for electrically and mechanically mounting a corresponding surge suppressor module; a second surge suppressor module comprising a second housing, a second surge suppressor circuit including a second ground, and a first means for electrical and mechanical connection to a first one of the means for electrically and mechanically mounting on a first one of the sides of the first housing of the first alternating current surge suppressor module, the second surge suppressor circuit electrically connecting the second ground to the first means for electrical and mechanical connection, in order that the second ground is electrically connected to the ground conductor through the first one of the means for electrically and mechanically mounting; and a third surge suppressor module comprising a third housing, a third surge suppressor circuit including a third ground, and a second means for electrical and mechanical connection to a second one of the means for electrically and mechanically mounting on a second one of the sides of the first housing of the first alternating current surge suppressor module, the third surge suppressor circuit electrically connecting the third ground to the second means for electrical and mechanical connection, in order that the third ground is electrically connected to the ground conductor through the second one of the means for electrically and mechanically mounting.

The plurality of means for electrically and mechanically mounting may include the first one, the second one and a third one of the means for electrically and mechanically mounting on three of the sides of the first housing. Each of the first one, the second one and the third one of the means for electrically and mechanically mounting may include a channel having a ground bar electrically connected to the ground conductor.

The first one and the second one of the means for electrically and mechanically mounting may comprise for each of at least some of the sides: a first groove, a channel parallel to the first groove, the channel including a first ground bar electrically connected to the ground conductor, and a second grove parallel to the channel. One of the second and third surge suppressor modules may include a pair of parallel tongues and a corresponding second ground bar. The first and second grooves may be adapted to capture the pair of parallel tongues of the one of the second and third surge suppressor modules. The first ground bar may be adapted to electrically engage the corresponding second ground bar of the one of the second and third surge suppressor modules.

The first and second grooves may have a dovetail shape and may be adapted to receive the pair of parallel tongues, which have a corresponding dovetail shape. The first ground bar of the channel may have an arcuate shape. The corresponding second ground bar of the one of the second and third surge suppressor modules may have an arcuate shape, which is adapted to mechanically engage the arcuate shape of the first ground bar of the channel, in order to increase friction between a portion of the dovetail shape of the pair of parallel tongues and a portion of the dovetail shape of the first and second grooves.

As another aspect of the invention, a surge suppressor module comprises: a power conductor; a ground conductor; a housing including a base, a cover and an opening, the base having a plurality of sides forming an exterior wall having a first thickness; and an alternating current surge suppressor circuit housed by the housing, the circuit receiving the power and ground conductors through the opening of the housing, the base including an interior wall having a second thickness, the interior wall separating the surge suppressor circuit from the exterior wall, in order that the interior wall absorbs pressure generated during a fault to the surge suppressor circuit.

The base may include a volume housing the surge suppressor circuit. The cover may include a surface having plurality of elongated openings and a barrier affixed to a portion of the surface apart from the elongated openings, in order to act as a pressure relief valve during a fault to the surge suppressor circuit.

The housing may include a barrier having a plurality of perforations within the volume and proximate the elongated openings of the surface of the cover, in order to prevent solid particles from exiting the elongated openings during a fault to the surge suppressor circuit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is disclosed in connection with an alternating current (AC) surge suppression module 2 (FIGS. 1-3), a telephone surge suppression module 4 (FIG. 4) and a cable surge suppression module 6 (FIG. 5), which may be interconnected and/or mounted separately, although it will be appreciated that the invention is applicable to a wide range of surge suppression modules for a variety of surge suppression applications.

Figure 1:
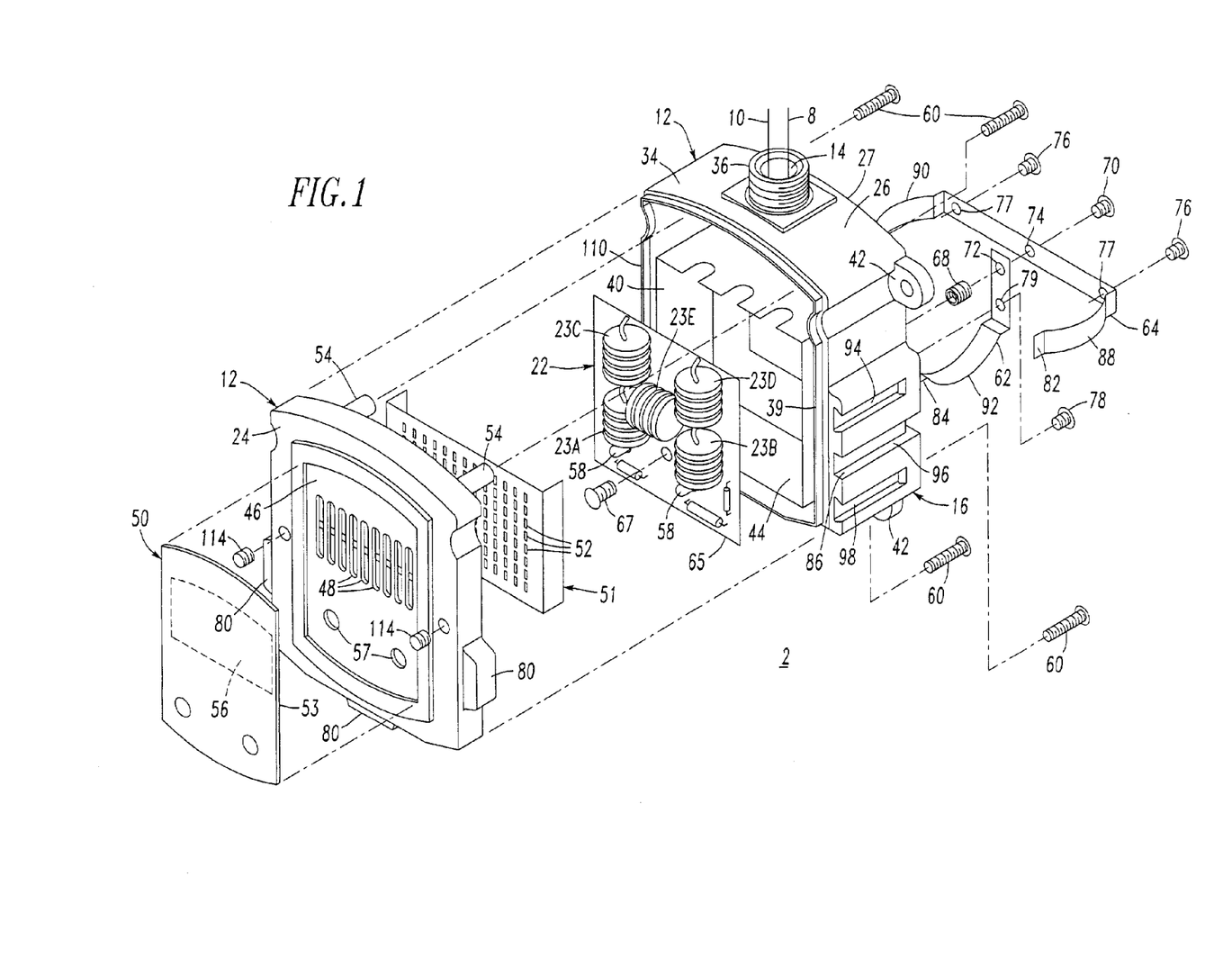
FIG. 1 is an exploded isometric view of an alternating current (AC) surge suppression module in accordance with the present invention.
Figure 2:
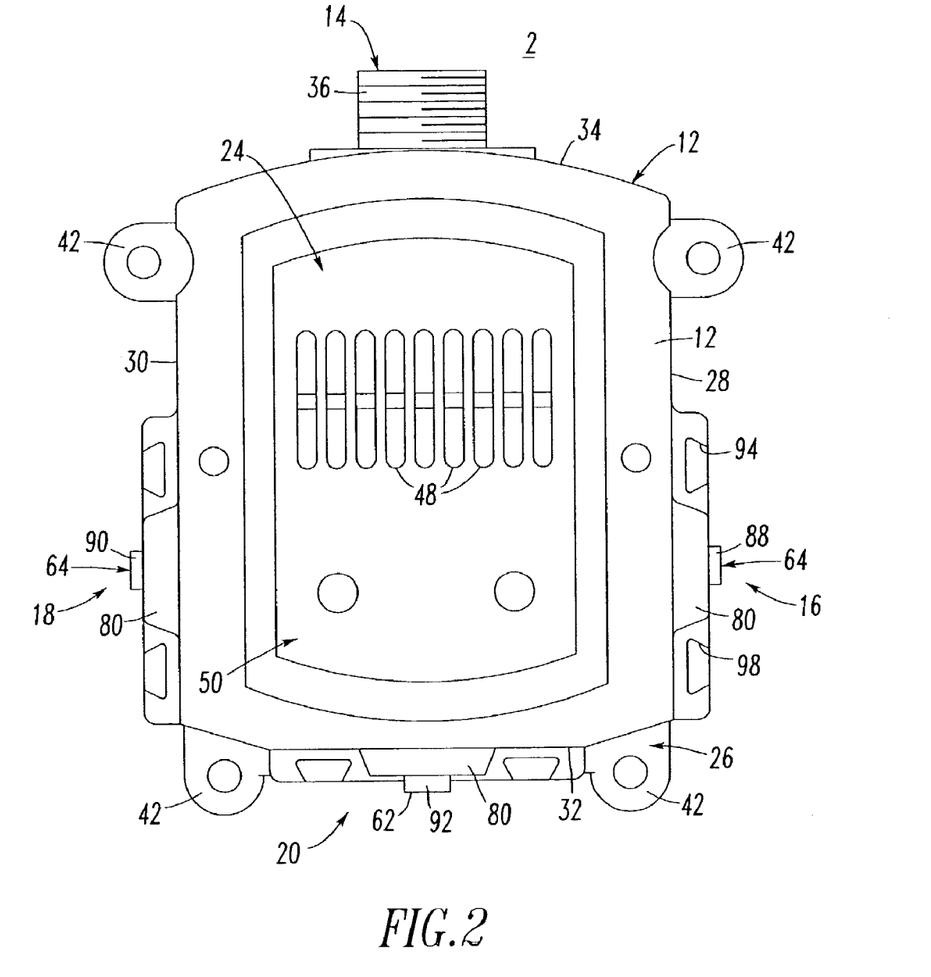
FIG. 2 is a plan view of the AC module of FIG. 1.
Figure 3:
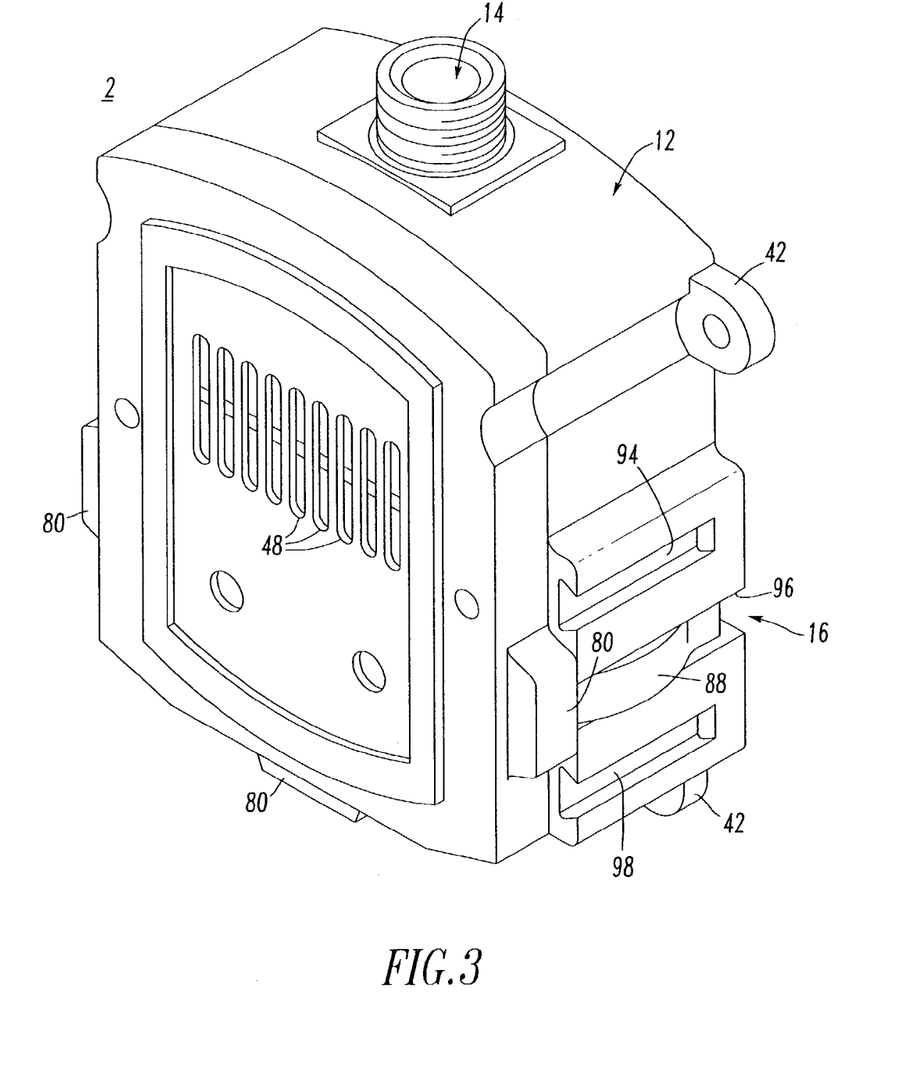
FIG. 3 is an isometric view of the AC module of FIG. 1.
Figure 4:
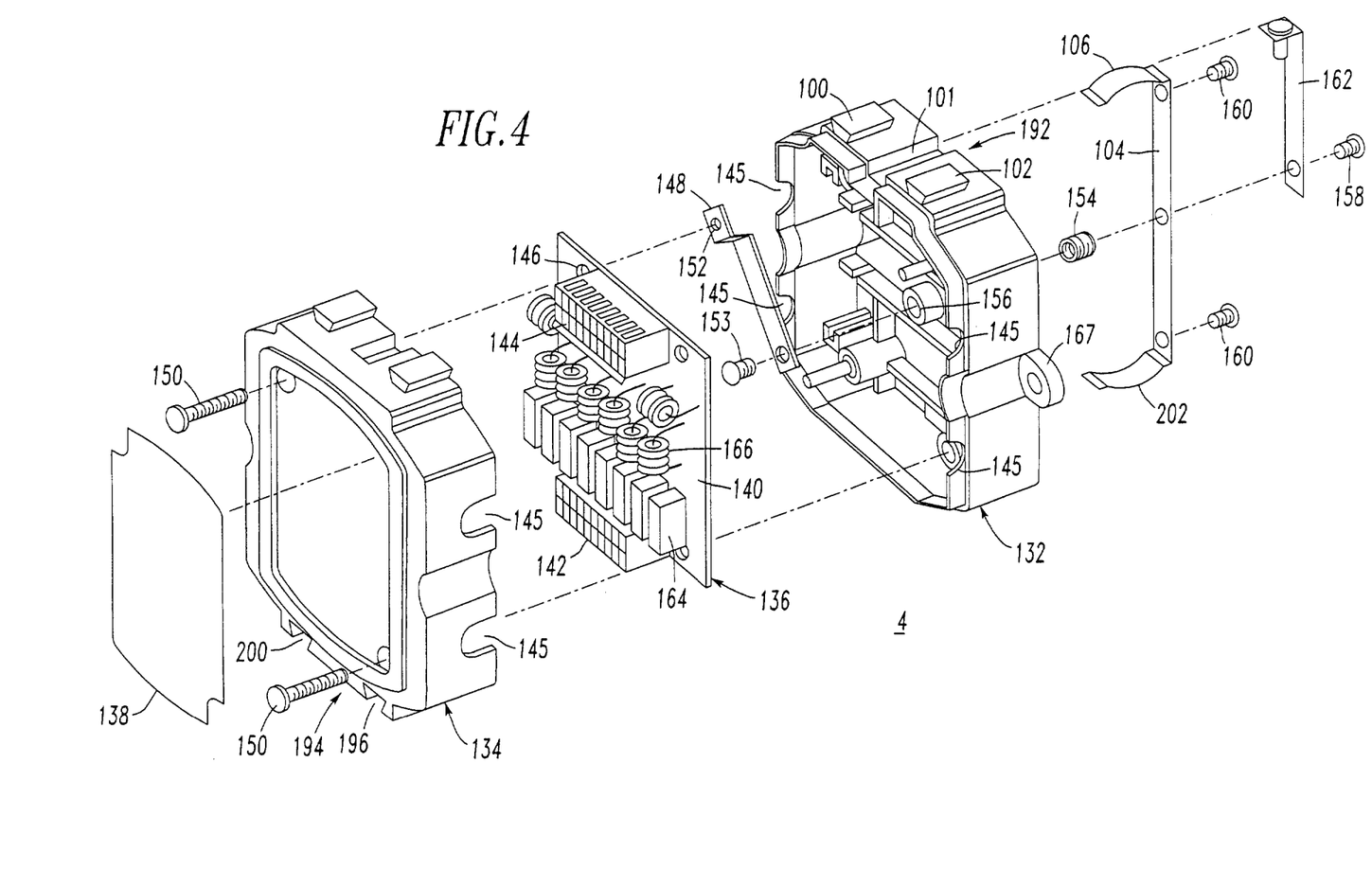
FIG. 4 is an exploded isometric view of a telephone surge suppression module in accordance with the present invention.
Figure 5:
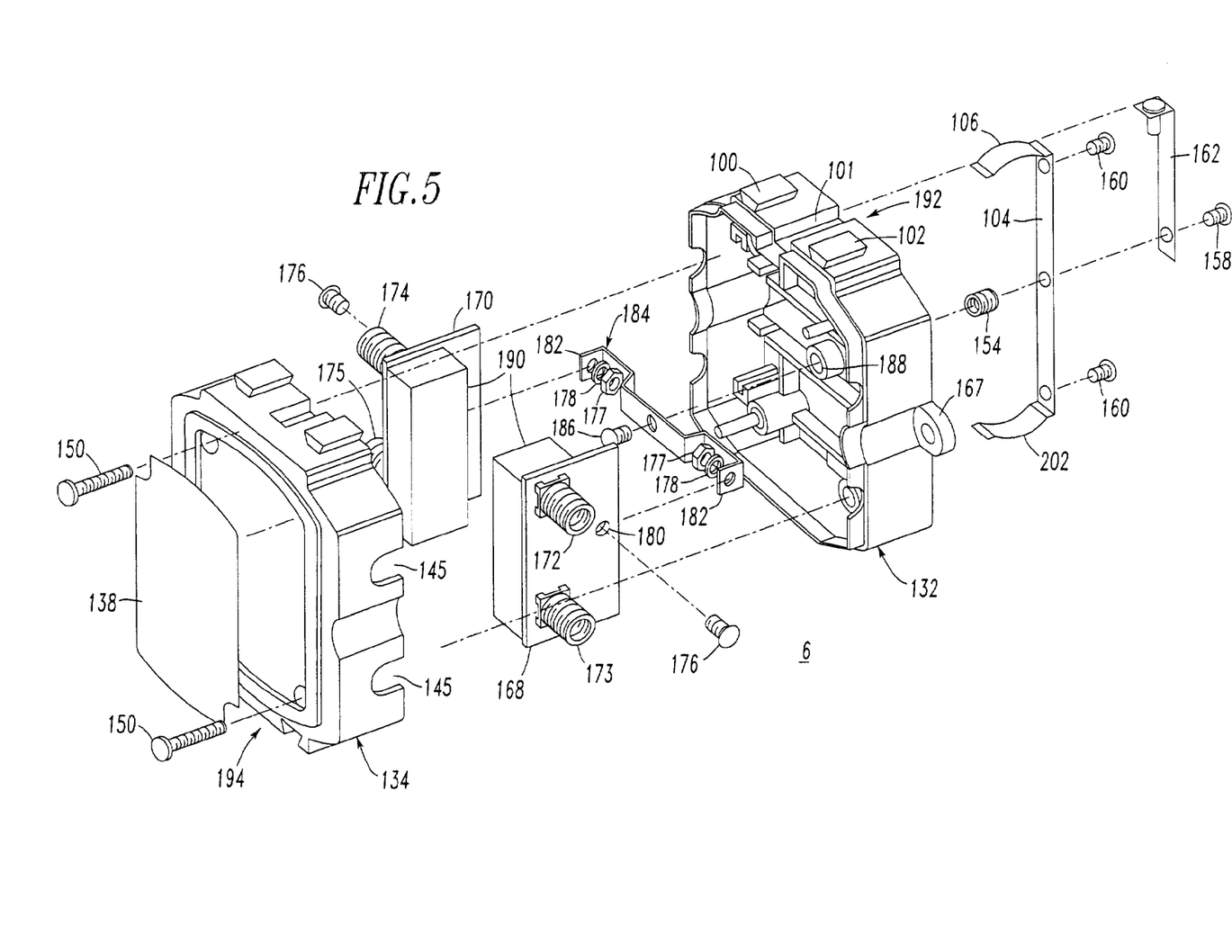
FIG. 5 is an exploded isometric view of a cable surge suppression module in accordance with the present invention.

Referring to FIGS. 1-3, the AC module 2 includes one or more power conductors 8, one or more ground conductors 10, and a housing 12 including an opening 14 and three interface mechanisms 16,18,20 (as best shown in FIG. 2) for electrically and mechanically mounting a corresponding surge suppressor module, such as the telephone module 4 of FIG. 4 and the cable module 6 of FIG. 5. An AC surge suppressor circuit 22 is housed by the housing 12.

Figures 14, 15:
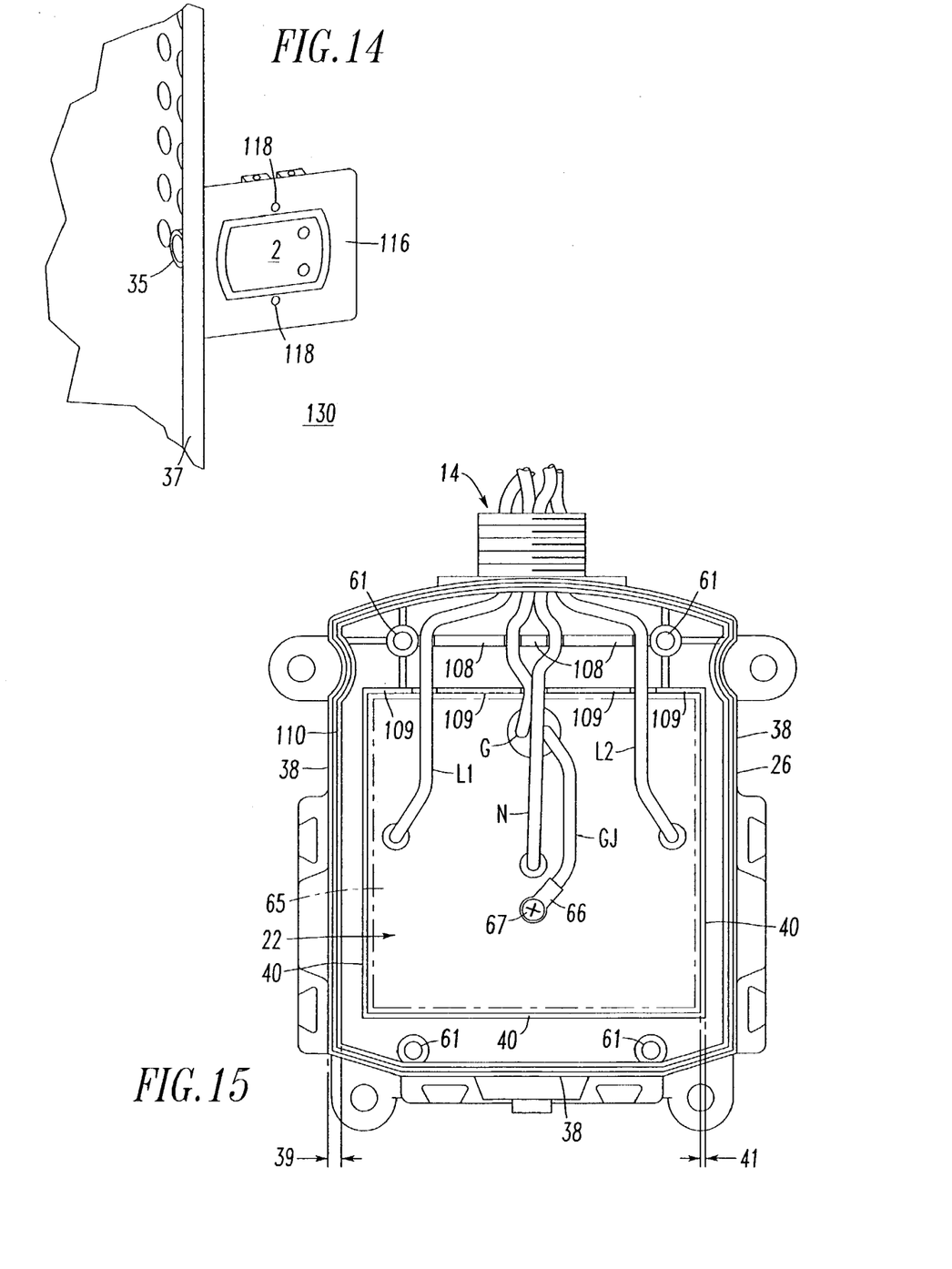
FIG. 14 is an isometric view showing the AC module of FIG. 1 connected to a portion of a panel board, with a flush mount surface connected to the cover of the AC module.
FIG. 15 is a plan view of the housing of the AC module of FIG. 1 with the cover removed to show internal electrical connections and the internal wall of the base.

For a residential application, for example, the power conductors 8 include lines L1 and L2 (FIG. 15), and the ground conductors 10 include a ground (G) and neutral (N) (FIG. 15). For such an application, the power source (not shown) is normally a split phase 120V (line L1)-neutral-120V (line L2). The source ends of the hot wires (L1 and L2) are electrically connected to the circuit breakers (not shown) in a panel board 37 (FIG. 8), and the ground (G) and neutral (N) conductors are electrically connected to a common ground bus (not shown) of such panel board. All of the conductors 8,10 (e.g., 14 AWG) pass through the opening 14 at a nipple connection 36 of the housing 12. For example, in this application, the voltage clamping devices include five sets (e.g., each including four parallel MOVs) of MOVs 23A (L1-G), 23B (L2-G), 23C (L1-N), 23D (L2-N) and 23E (N-G). Although parallel MOVs are shown, a wide range of configurations employing any suitable voltage clamping device may be employed.

The circuit 22 receives the power and ground conductors 8,10 (e.g., L1,L2,G,N of FIG. 15) through the housing opening 14. In accordance with a preferred practice of the invention, the circuit 22 electrically connects the ground (G) conductor to the three interface mechanisms 16,18,20, in order to provide a common ground connection thereto.

Figure 8:
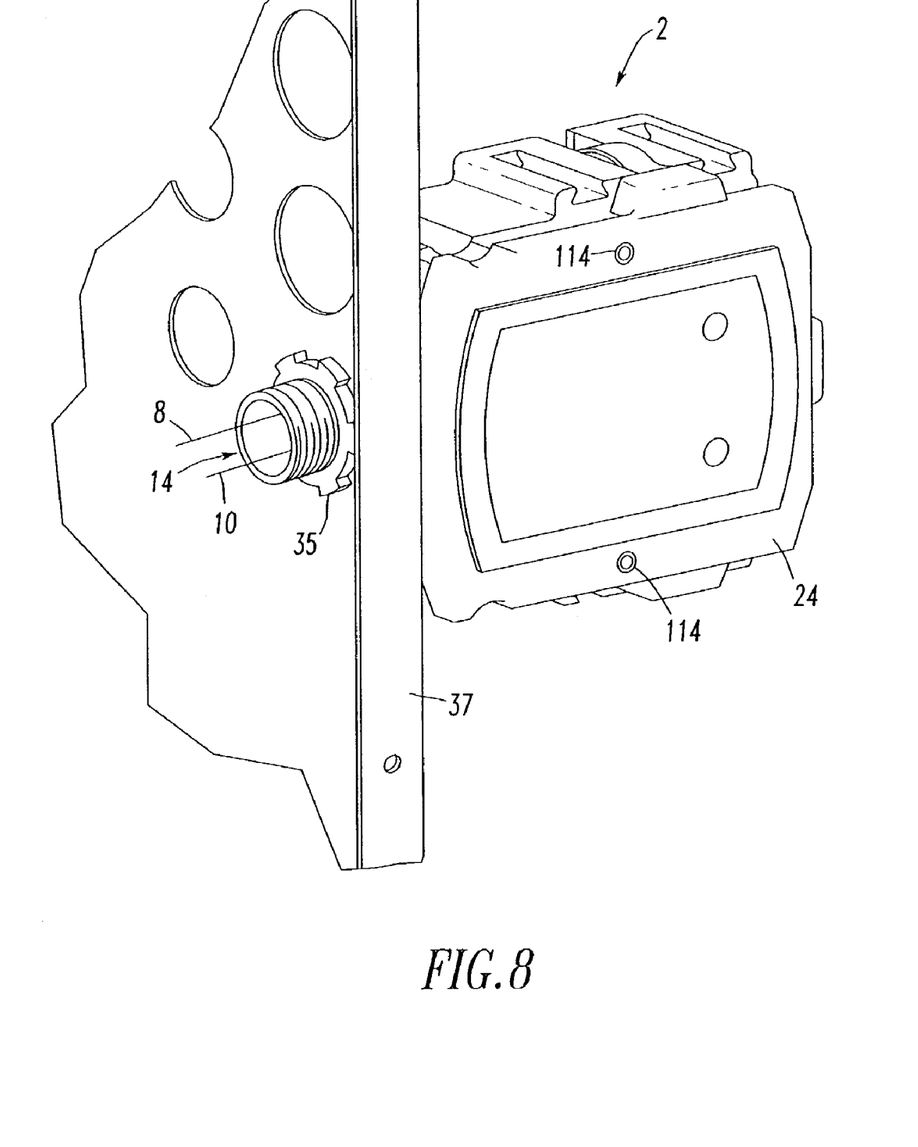
FIG. 8 is an isometric view of the AC module of FIG. 1 connected to a portion of a panel board.

As shown in FIG. 1, the housing 12 (e.g., made of injected thermo-resin) includes a cover 24 and a base 26 having a bottom 27 opposite the cover 24 and four sides 28,30,32,34. For example, as shown in FIG. 2, three of the sides 28, 30 and 32 have the three interface mechanisms 16, 18 and 20, respectively. The fourth side 34 has the nipple connection 36 (e.g., a ½" NPT nipple) disposed proximate the opening 14. The threaded nipple connection 36 including a nut 35 are adapted to mount the AC module 2 to a knockout opening of a panel board or load center 37 as shown in FIG. 8.

The four sides 28,30,32,34 of the base 26 form an exterior wall 38 having a first thickness 39 (e.g., about 3 mm; about 4 mm) as shown in FIG. 15. The base 26 also includes an interior wall 40 having a smaller second thickness 41 (e.g., about 1 mm) as also shown in FIG. 15. The relatively thin interior wall 40 separates the surge suppressor circuit 22 from the relatively thicker exterior wall 38, in order that the interior wall 38 absorbs relatively high pressure generated during a fault (e.g., caused by applying a continuous overvoltage resulting from improper wiring connections or a supply line problem) to the surge suppressor circuit 22. Also, the interior wall 38 protects internal electrical components of the circuit 22 by providing a second housing barrier for water intrusion that might occur during outdoor mounting.

As shown in FIG. 2, the base 26 includes a plurality of ears 42 adapted to mount the surge suppressor module 2 to a surface (not shown).

As shown in FIG. 1, the base 26 includes a volume 44 housing the surge suppressor circuit 22. The cover 24 includes a surface 46 having plurality of elongated openings, such as slots 48. A suitable barrier, such as, for example, a label 50 made of a polycarbonate resin sheet material, such as Lexan®, is affixed to a portion of the surface 46 apart from the elongated openings 48, in order to act as a pressure relief valve, which reduces internal pressure developed during a fault condition to the surge suppressor circuit 22. The slots 48 serve as an escape route for ionized gas, which is developed inside the housing 12 during a fault condition.

The housing 12 also includes a suitable barrier, such as, for example, fish paper 51, having a plurality of perforations 52 disposed within the volume 44, on top of the circuit 22 and proximate the slots 48 of the surface 46 of the cover 24, in order to prevent solid or molten particles from exiting the slots 48 and escaping the housing 12 during a fault to the surge suppressor circuit 22. However, the perforations 52 allow ionized gas to escape therethrough. Without the exemplary slots 48 and label 50, the interior base walls 40 and mounting posts 54 would, otherwise, need to be relatively thicker, thereby increasing cost.

The label 50 seals the slots 48 and opens up only when there is sufficient pressure inside the housing 12. The label seal, therefore, is normally closed and prevents water or foreign matter from entering the housing 12. Preferably, a suitable adhesive (not shown) is pre-applied behind a suitable paper backing (not shown) (or a suitable glue (not shown) is applied) on a portion of the surface 53 of the label 50 facing the surface 46 of the cover 24. That label surface portion excludes the area 56 shown in hidden line drawing on FIG. 1. Hence, the adhesive or glue on the label 50 is only proximate its outside edge and in the area surrounding openings 57 for LEDs 58 on the surge suppressor circuit 22. This reduces the adhesion area of the label 50, but is sufficient to prevent water from coming inside the housing 12. The label adhesive or glue is placed such that it covers a relatively larger area about the LED openings 57, in order to allow the label 50 to bend and not blow off completely due to relatively high pressure during a fault condition.

Figure 7:
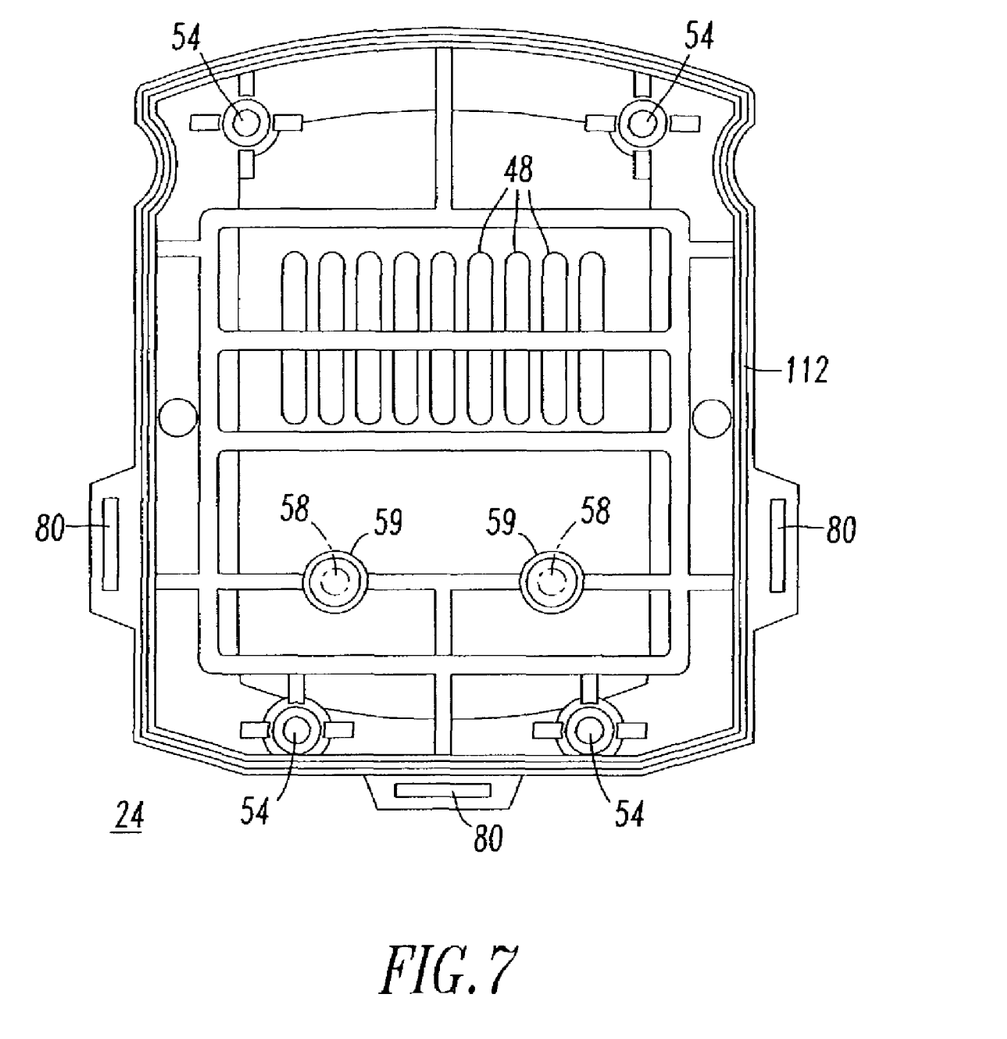
FIG. 7 is a bottom view of the cover of the AC module of FIG. 1.

The label 50 preferably has a transparent finish directly on top of the LEDs 58 at the surface openings 57, in order to provide visibility. As shown in FIG. 7, the LEDs 58 (shown in phantom line drawing) pass through tubes 59 formed as part of the cover 24. The circuitry for the LEDs 58 of the surge suppressor circuit 22 includes, for example, the series connection (not shown) of a diode, a resistor and the first LED 58 between the first line (L1) and ground (G), and the series connection (not shown) of a diode, a resistor and the second LED 58 between the second line (L2) and ground (G), in order to illuminate such LEDs for the energized state of those two power lines L1,L2.

The cover 24 includes four mounting posts 54 (as best shown in FIG. 7). As shown in FIGS. 1 and 15, four screws 60 pass through openings 61 in the base 26 and secure such base to the four posts 54 of the cover 24.

The surge suppressor circuit 22 contains the voltage clamping devices 23A-23E, the LEDs 58 and associated LED circuitry (not shown) and, also, provides electrical connection between the conductors L1,L2,G,N of FIG. 15 and the ground bus bars 62,64. As shown in FIG. 15, the electrical connection from the ground (G) conductor is provided by a trace (not shown) of the printed circuit board (PCB) 65 to a ground jumper (GJ) to a terminal lug 66. A screw 67 holds the PCB 65 against a bushing 68, which is disposed between the PCB 65 and within an opening (not shown) in the bottom 27 of the housing 12. The bushing 68 electrically and mechanically engages a ground pad (not shown) on the bottom of the PCB 65. That bottom pad is electrically connected by a PCB via (not shown) to a pad (not shown) on the top of the PCB 65. That top pad is electrically connected to the terminal lug 66 and, thus, to the ground jumper (GJ) and ground (G) conductor. The screw 67 also electrically connects the terminal lug 66 to the bushing 68. The bushing 68 is threaded internally and is press fitted into an opening (not shown) in the housing bottom 27. A screw 70 electrically connects the ground bus bars 62,64 through respective openings 72,74 to the bushing 68 and, also, mechanically secures the bus bars 62,64 to the bushing 68 and the housing 12. Therefore, the top ground pad on the PCB 65 below the screw 67 and the terminal lug 66 is electrically connected to the ground bus bars 62,64 and to the ground (G) conductor. Two screws 76 secure the ends of the bus bar 64 at openings 77 to the housing bottom 27. Another screw 78 secures a portion of the bus bar 62 at opening 79 to the housing bottom 27. As best shown in FIG. 7, the cover 24 includes three openings 80, which mechanically retain two ends 82 (only one end 82 is shown in FIG. 1) of the bus bar 64 and one end 84 of the bus bar 62.

As shown in FIG. 2, the three interface mechanisms 16,18,20 are on the three sides 28,30,32, respectively, of the cover 24. Each of those mechanisms 16,18,20 includes a channel 86 (only one channel 86 is shown in FIG. 1 for interface mechanism 16) and also includes an arcuate portion, such as 88 of the bus bar 64, which is electrically connected to the ground (G) conductor, as was discussed above. As shown in FIGS. 1 and 2, the two ends of the bus bar 64 have arcuate portions 88,90, which are employed with the respective interface mechanisms 16,18. Also, the end of the bus bar 62 has arcuate portion 92, which is employed with the interface mechanism 20.

Figure 6:
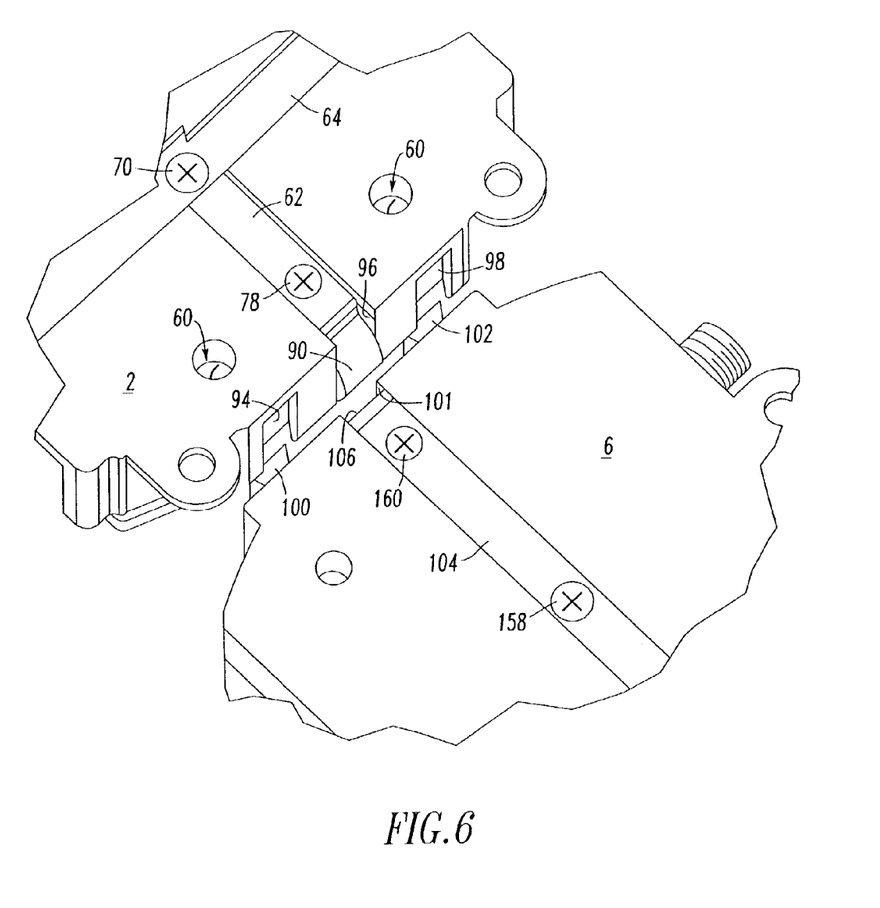
FIG. 6 is an isometric view of the AC module of FIG. 1 during electrical and mechanical engagement with the cable module of FIG. 5.

As shown with the interface mechanism 16 of FIGS. 1-3, each of the interface mechanisms 16,18,20 includes a first dovetail groove 94, a channel 96 parallel to the first dovetail groove 94, and a second dovetail groove 98 parallel to the channel 96. The channel 96 includes the arcuate portion 88 of the ground bar 64, which is electrically connected to the ground (G) conductor. As shown in FIG. 6, the cable surge suppressor module 6 of FIG. 5 includes a pair of parallel dovetail tongues 100,102 and an arcuate portion 106 of a corresponding second ground bar 104 in a channel 101 therebetween. The first and second dovetail grooves 94,98 of the interface mechanism 18 of the module 2 are adapted to capture the respective parallel dovetail tongues 100,102 of the module 6. Also, the arcuate or curved portion 90 of the ground bar 62 is adapted to electrically and mechanically engage the corresponding arcuate or curved portion 106 of the ground bar 104 of the module 6. This engagement provides suitable spring force, which advantageously increases the friction between a portion of the dovetail tongues 100,102 and a portion of the dovetail grooves 94,98, while also providing a reliable electrical connection between the ground bars 62,104. Hence, the ground bars 62,104 provide pressure and prevent the modules 4,6 from being accidentally disengaged from the module 2. Although dovetail grooves and tongues are shown, any suitably shaped grooves and tongues may be employed for mechanical engagement and capture.

The telephone surge suppressor module 4 of FIG. 4 includes the same dovetail tongues 100,102 and the same ground bar 104 as that of the module 6 of FIG. 5. Hence, either one or both of the modules 4,6 may be electrically and mechanically engaged with any of the three interface mechanisms 16,18,20 on the sides 28,30,32, respectively, of the cover 24 of the AC module 2, by sliding one of the modules 4,6 from the top (cover) side of the module 2 as shown by the bottom view of FIG. 6. Those dovetail tongues 100,102 of those modules 4,6 have the positive image of the dovetail grooves 94,98 of the module 2. Any surges associated with the modules 4,6 are diverted to a corresponding one of the ground bus bars 62,64 of the AC module 2 from the other ground bus bar 104 of the telephone and cable modules 4,6. Since the AC module ground bus bars 62,64 are connected to the ground (G) conductor, such surges are also diverted to ground.

As shown in FIG. 15, the housing base 26 includes gas diverters or baffles 108 proximate the housing opening 14, which baffles reduce the amount of ionized gas coming out of the opening 14 of the nipple connection 36. This ensures that most of such gas escapes through the cover slots 48. The baffles 108 also advantageously serve as a strain relief holder for the conductors L1,L2,G,N. To a smaller extent, portions 109 of the interior base wall 40 also serve as baffles and strain relief holders.

The cover 24 and base 26 of the housing 12 are preferably interconnected by a tongue and groove arrangement along with a suitable seal. As shown in FIGS. 15 and 7, the base 26 includes a tongue 110 and the cover 24 includes a corresponding groove 112 around the entire periphery thereof. A suitable O-ring gasket (not shown) or silicone seal (not shown) may be applied to the tongue 110 and the groove 112 before closing the housing 12, in order to inhibit water from entering therein.

As shown in FIGS. 8 and 14, the cover 24 includes two threaded openings 114 adapted to flush mount the surge suppressor module 2 to a surface, such as a flush mount plate 116 of a finish wall (not shown), by threaded fasteners 118.

Figure 9:
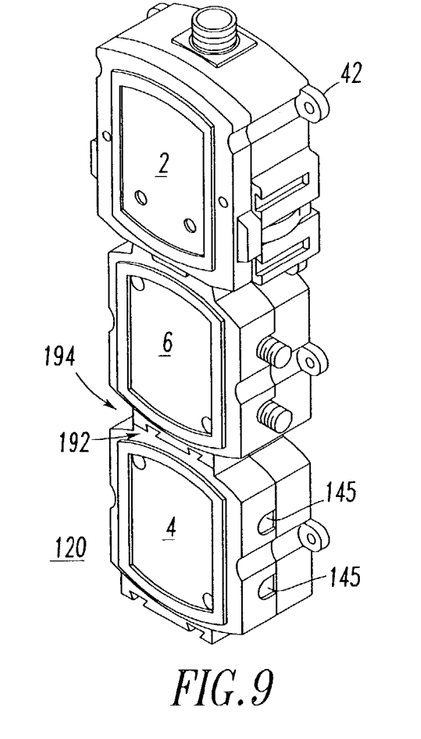
FIGS. 9-11 are isometric views showing different mounting configurations of the AC module of FIG. 1 with the telephone module of FIG. 4 and the cable module of FIG. 5.
Figure 10:
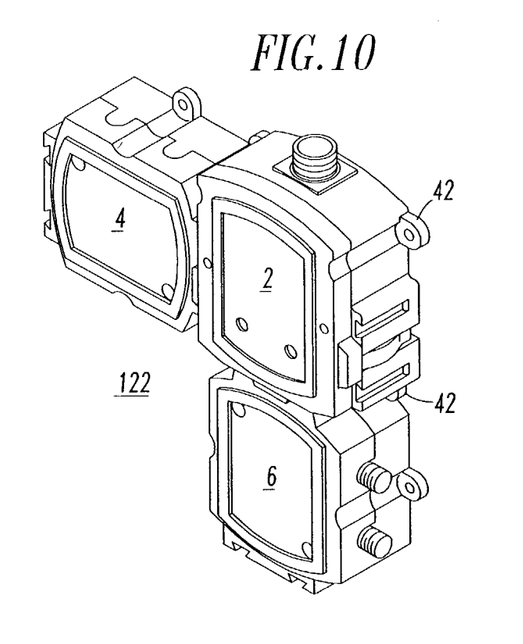
Figure 11:
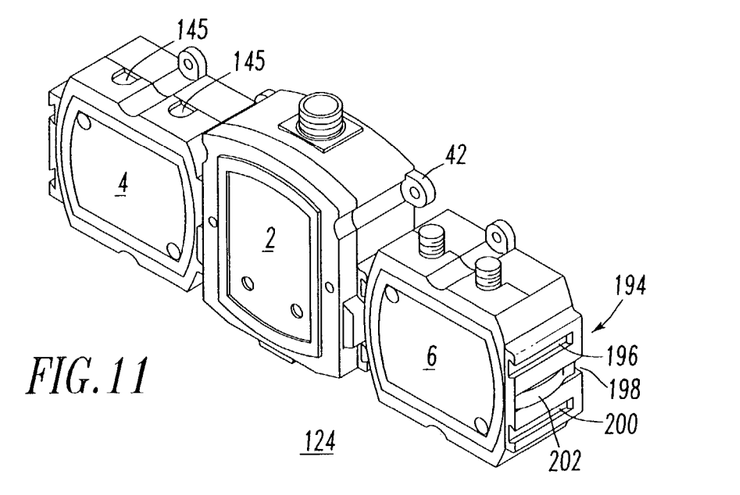

FIGS. 9, 10 and 11 show three interconnection examples of modular surge suppressor systems 120, 122 and 124, respectively, employing the modules 2,4,6. These example systems may be mounted to a suitable surface (not shown) by employing fasteners (not shown) at the ears 42 of the AC module 2.

Figure 12:
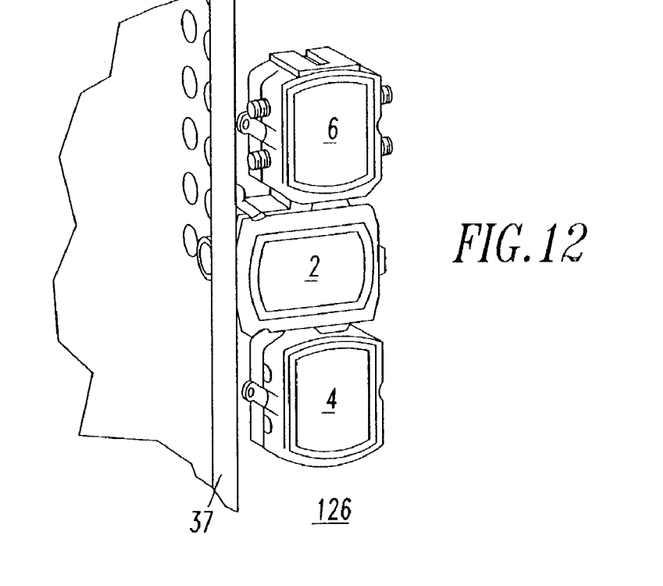
FIG. 12 is an isometric view showing the AC module of FIG. 1 connected to a portion of a panel board, with the telephone module of FIG. 4 connected to one side of the AC module and with the cable module of FIG. 5 connected to the opposite side of the AC module.
Figure 13:
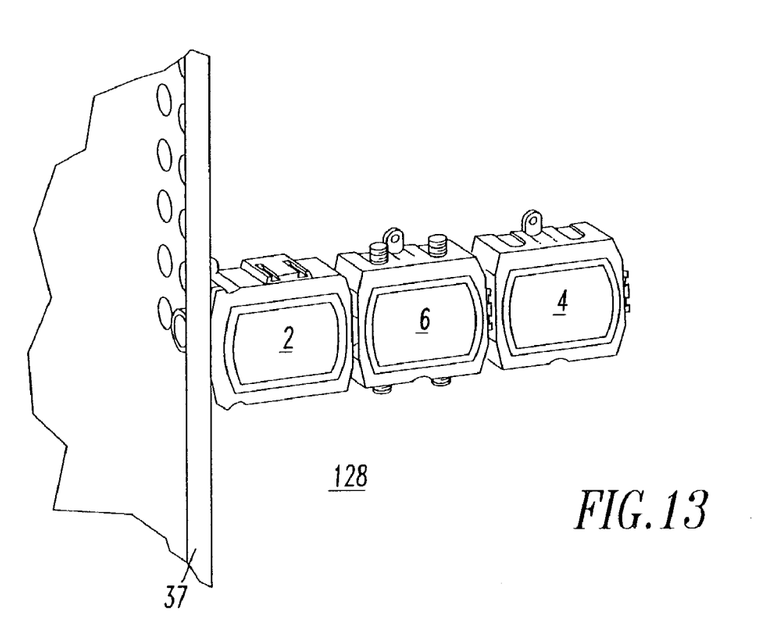
FIG. 13 is an isometric view showing the AC module of FIG. 1 connected to a portion of a panel board, with one side of the cable module of FIG. 5 connected to the AC module and with the telephone module of FIG. 4 connected to the opposite side of the cable module.

FIGS. 12 and 13 show two interconnection examples of modular surge suppressor systems 126 and 128, respectively, employing the modules 2,4,6. These example systems are mounted to the panel board 37 in the same manner as was discussed above in connection with FIG. 8. Although not shown, the surge suppressor system 130 of FIG. 14 may include one or more of the modules 4,6 (which are not shown in FIG. 14).

Referring to FIG. 4, the telephone module 4 has a somewhat similar construction as the AC module 2 of FIG. 1. The module 4 includes a base 132, a cover 134, a telephone surge suppressor circuit 136 and a decorative label 138. The base 132 and cover 134 are preferably made of an injected thermo-resin. For installation, the cover 134 is opened up, in order to gain access to the printed circuit board (PCB) 140 and its connectors 142,144. Wires (not shown) from the telephone company (not shown) go on connector 142 and demarcation point or protected telephone equipment wires (not shown) are connected to connector 144. Those wires enter and exit the module 4 through two of four openings 145 formed by the base 132 and cover 134.

In this embodiment, a ground pad 146 and corresponding ground traces are on the edge of the PCB 140 and are electrically connected to a ground bar 148 by a screw 150 at threaded opening 152. The other end of the ground bar 148 is connected by a screw 153 to a threaded bushing 154, which is press fit within a bottom opening 156 of the base 132. Another screw 158 electrically and mechanically connects the ground bar 104 to the bushing 154. Two other screws 160 attach the ground bar 104 to the base 132. This prevents the ground bar 104 from bending when the module 4 is being detached from another module, such as module 2 of FIG. 10 or module 6 of FIG. 9. An optional ground bar 162 may be electrically and mechanically connected to the ground bar 104 by the screw 158, in order to allow a separate grounding connection when the AC module 2 is not being used. The label 138 is for decorative purposes and is suitably attached to the cover 134 by an adhesive or glue (not shown).

Normally, the telephone module 4 employs two of the four openings 145. The connectors 142,144 accept four pairs of wires (not shown), for eight total conductors. For each of those conductors, the PCB 140 employs a series connected Raychem® PolySwitch® circuit protection device marketed by Tyco International Ltd. of Menlo Park, Calif., or other suitable polymer fuse 164 between the input side at connector 142 and the output side at connector 144. Also, for each of those conductors, the PCB 140 employs a suitable (e.g., 230V) gas tube 166 from the output side of the corresponding fuse 164 to ground at the ground pad 146.

The base 132 includes a pair of ears 167 (only one ear 167 is shown in FIG. 4), which are adapted to mount the module 4 to a surface (not shown).

As shown in FIG. 5, the construction of the cable module 6 is similar to the construction of the telephone module 4 of FIG. 4. Unlike the telephone module 4, the cable module 6 includes two PCBs 168 and 170 having respective F-connectors 172,173 and 174,175, which connect to cable connected equipment (not shown). Two sets of screws 176, nuts 177 and lock washers 178 electrically and mechanically connect ground pads 180 (only one pad is shown in FIG. 5) of the PCBs 168,170 to ends 182 of a ground bar 184. The ground bar 184 is electrically and mechanically connected to the ground bar 104 by a screw 186 and the bushing 154, which is press fit in an opening 188 in the bottom of the base 132. The ground bar 162 is employed to electrically connect a ground wire (not shown) from an AC panel board (not shown) in the event that the AC module 2 of FIG. 1 is not employed. Otherwise, as was discussed above, the AC module 2 is the source of the ground electrical connection from the ground (G) conductor to the cable module 6 and to the telephone module 4 of FIG. 4.

The cable module PCBs 168,170 employ the four F-connectors 172,173,174,175 for cable-in (e.g., from a cable service provider) and cable-out (e.g., to a television accepting a cable input), and for cable-in (e.g., from a satellite dish) and cable-out (e.g., to a satellite receiver accepting a cable input). The PCBs 168 and 170 each employ a suitable voltage clamping device, such as 145V gas tubes 190, which are electrically connected between the common center conductor of the F-connector pairs 172-173 and 174-175 to the ground pad 180 or shield of such connectors.

As was discussed above, the modules 4,6 include dovetail tongues 100,102 and the arcuate portion 106 of ground bar 104 therebetween, which together form an interface mechanism 192 to one of the interface mechanisms 16,18,20 of the AC module 2 of FIGS. 1-3. In addition, each of the modules 4,6 advantageously includes another interface mechanism 194, which is electrically and mechanically identical to the interface mechanisms 16,18,20 of the AC module 2. In this manner, as shown in FIG. 9, the telephone module 4 may be electrically and mechanically connected to the interface mechanism 194 of the cable module 6, or the cable module 6 may be electrically and mechanically connected to the interface mechanism 194 (not shown) of the telephone module 4.

As shown in FIG. 11, the interface mechanism 194 includes a first dovetail groove 196, a channel 198 parallel to the first dovetail groove 196, and a second dovetail groove 200 parallel to the channel 198. The channel 198 includes the arcuate portion 202 of the ground bar 104, which is electrically connected to the ground pad 146 as was discussed above. In the same manner as the interface mechanisms 16,18,20 of the AC module 2, those interface mechanisms 194 suitably electrically and mechanically engage the interface mechanism 192 of the other telephone or cable module 4,6.

The AC module housing 12 of FIG. 1 may provide an outdoor NEMA 4x rating, which provides a sealed enclosure that is splash proof. There may be one AC module 2 per panel board or load center 37.

The AC module 2 employs a panel board direct connection (FIGS. 12-14) or a surface connection (FIGS. 9-11). Hence, this module 2 may be employed indoors, outdoors with a NEMA 4x enclosure, or surface mounted through the mounting ears 42.

Each of the modules 2,4,6 of FIGS. 1-5 may be interconnected or may be separately surface mounted close to an AC panel board or load center, such as 37.

The exemplary modules 2,4,6 provide a flexible mounting configuration for residential surge suppressors in which a common ground connection is provided.

The AC module 2 includes ground bus bars 62,64, which hold the other modules 4,6 and, also, allow the ground (G) conductor to be electrically connected to such modules 2,4,6.

The exemplary telephone and cable modules 4,6 may be connected in three manners: (1) directly to the AC module 2; (2) indirectly to another cable or telephone module 6,4; or (3) on a surface, thereby allowing relatively greater mounting flexibility.

The AC module 2 employs the interface mechanisms 16,18,20, which allow for mounting the modules 4,6 on three different sides of the module 2 and, at the same time, which electrically connect the grounds of the modules 2,4,6 together. This provides an effective electrical and mechanical arrangement of the diverse surge suppression modules 2,4,6 in a wide variety of modular surge suppression systems.

The interior wall 40, the perforated barrier 51, the slotted cover 24 and the label 50 of the AC module housing 12 cooperate to provide an effective enclosure which provides an improved response to catastrophic wiring faults and power line fault conditions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A modular surge suppressor system comprising:
   a first alternating current surge suppressor module comprising:
   a power conductor;
   a ground conductor;
   a first housing including an opening, a plurality of sides and a plurality of means for electrically and mechanically mounting a corresponding surge suppressor module; and
   a first alternating current surge suppressor circuit housed by said first housing, said circuit receiving said power and ground conductors through the opening of said first housing, said circuit including a first ground and electrically connecting said ground conductor to said first ground and to said plurality of means for electrically and mechanically mounting a corresponding surge suppressor module;
   a second surge suppressor module comprising a second housing, a second surge suppressor circuit including a second ground, and a first means for electrical and mechanical connection to a first one of said means for electrically and mechanically mounting on a first one of said sides of the first housing of said first alternating current surge suppressor module, said second surge suppressor circuit electrically connecting said second ground to said first means for electrical and mechanical connection, in order that said second ground is electrically connected to said ground conductor through said first one of said means for electrically and mechanically mounting; and a third surge suppressor module comprising a third housing, a third surge suppressor circuit including a third ground, and a second means for electrical and mechanical connection to a second one of said means for electrically and mechanically mounting on a second one of said sides of the first housing of said first alternating current surge suppressor module, said third surge suppressor circuit electrically connecting said third ground to said second means for electrical and mechanical connection, in order that said third ground is electrically connected to said ground conductor through said second one of said means for electrically and mechanically mounting, wherein each of said first and second means for electrical and mechanical connection comprises: a first tongue, a channel parallel to said first tongue, said channel including a first ground bar electrically connected to a corresponding one of said second and third grounds, and a second tongue parallel to said channel, wherein said first alternating current surge suppressor module includes a pair of parallel grooves and a second ground bar, wherein said first and second tongues are adapted to be captured by said pair of parallel grooves of said first alternating current surge suppressor module, and wherein said first ground bar is adapted to electrically engage the second ground bar of said first alternating current surge suppressor module.

2. The modular surge suppressor system of claim 1 wherein said first housing includes a cover and a base, said base having said sides and a bottom opposite said cover.

3. A modular surge suppressor system comprising:

a first alternating current surge suppressor module comprising:

a power conductor;

a ground conductor;

a first housing including an opening, a plurality of sides and a plurality of means for electrically and mechanically mounting a corresponding surge suppressor module; and   a first alternating current surge suppressor circuit housed by said first housing, said circuit receiving said power and ground conductors through the opening of said first housing, said circuit including a first ground and electrically connecting said ground conductor to said first ground and to said plurality of means for electrically and mechanically mounting a corresponding surge suppressor module;

a second surge suppressor module comprising a second housing, a second surge suppressor circuit including a second ground, and a first means for electrical and mechanical connection to a first one of said means for electrically and mechanically mounting on a first one of said sides of the first housing of said first alternating current surge suppressor module, said second surge suppressor circuit electrically connecting said second ground to said first means for electrical and mechanical connection, in order that said second ground is electrically connected to said ground conductor through said first one of said means for electrically and mechanically mounting; and a third surge suppressor module comprising a third housing, a third surge suppressor circuit including a third ground, and a second means for electrical and mechanical connection to a second one of said means for electrically and mechanically mounting on a second one of said sides of the first housing of said first alternating current surge suppressor module, said third surge suppressor circuit electrically connecting said third ground to said second means for electrical and mechanical connection, in order that said third ground is electrically connected to said ground conductor through said second one of said means for electrically and mechanically mounting, wherein said first housing includes a cover and a base, said base having said sides and a bottom opposite said cover;

wherein said first one and said second one of said means for electrically and mechanically mounting comprise for each of at least some of said sides: a first groove, a channel parallel to said first groove, said channel including a first ground bar electrically connected to said ground conductor, and a second grove parallel to said channel; wherein one of said second and third surge suppressor modules includes a pair of parallel tongues and a corresponding second ground bar; wherein said first and second grooves are adapted to capture the pair of parallel tongues of said one of said second and third surge suppressor modules; and wherein said first ground bar is adapted to electrically engage said corresponding second ground bar of said one of said second and third surge suppressor modules.

4. The modular surge suppressor system of claim 3 wherein said first and second grooves have a dovetail shape and are adapted to receive the pair of parallel tongues, which have a corresponding dovetail shape; wherein said first ground bar of said channel has an arcuate shape; wherein the corresponding second ground bar of said one of said second and third surge suppressor modules has an arcuate shape, which is adapted to mechanically engage the arcuate shape of the first ground bar of said channel, in order to increase friction between a portion of the dovetail shape of said pair of parallel tongues and a portion of the dovetail shape of said first and second grooves.

5. The modular surge suppressor system of claim 1 wherein a third one of said sides is structured to mechanically connect to a panel board or a load center.

6. The modular surge suppressor system of claim 1 wherein said first side is opposite said second side.

7. The modular surge suppressor system of claim 1 wherein said first side is disposed at a right angle with respect to said second side.

8. The modular surge suppressor system of claim 1 wherein said second surge suppressor module includes a first side adapted for electrical and mechanical connection to the first one of said means for electrically and mechanically mounting on a first one of said sides of the first housing, and a second side adapted for electrical and mechanical connection to another surge suppressor module.

9. The modular surge suppressor system of claim 1 wherein each of said second and third surge suppressor modules includes means for electrical and mechanical connection to another surge suppressor module.

10. The modular surge suppressor system of claim 9 wherein each one of said second and third surge suppressor modules includes a ground bar for both of said means for electrical and mechanical connection to another surge suppressor module.

11. A modular surge suppressor system comprising:

a first alternating current surge suppressor module comprising:

a power conductor;

a ground conductor;
a first housing including an opening, a plurality of sides and a plurality of means for electrically and mechanically mounting a corresponding surge suppressor module; and
a first alternating current surge suppressor circuit housed by said first housing, said circuit receiving said power and ground conductors through the opening of said first housing, said circuit including a first ground and electrically connecting said ground conductor to said first ground and to said plurality of means for electrically and mechanically mounting a corresponding surge suppressor module;
a second surge suppressor module comprising a second housing, a second surge suppressor circuit including a second ground, and a first means for electrical and mechanical connection to a first one of said means for electrically and mechanically mounting on a first one of said sides of the first housing of said first alternating current surge suppressor module, said second surge suppressor circuit electrically connecting said second ground to said first means for electrical and mechanical connection, in order that said second ground is electrically connected to said ground conductor through said first one of said means for electrically and mechanically mounting; and
a third surge suppressor module comprising a third housing, a third surge suppressor circuit including a third ground, and a second means for electrical and mechanical connection to a second one of said means for electrically and mechanically mounting on a second one of said sides of the first housing of said first alternating current surge suppressor module, said third surge suppressor circuit electrically connecting said third ground to said second means for electrical and mechanical connection, in order that said third ground is electrically connected to said ground conductor through said second one of said means for electrically and mechanically mounting,
wherein each of said second and third surge suppressor modules includes means for electrical and mechanical connection to another surge suppressor module,
wherein each of said means for electrical and mechanical connection to another surge suppressor module comprises: a first groove, a channel parallel to said first groove, said channel including a first ground bar electrically connected to a corresponding one of said second and third grounds, and a second groove parallel to said channel; wherein said another surge suppressor module includes a pair of parallel tongues and a second ground bar; wherein said first and second grooves are adapted to capture said pair of parallel tongues of said another surge suppressor module; and wherein said first ground bar is adapted to electrically engage the second ground bar of said another surge suppressor module.

12. A modular surge suppressor system comprising:
a first alternating current surge suppressor module comprising:
  a power conductor;
  a ground conductor;
  a first housing including an opening, a plurality of sides and a plurality of means for electrically and mechanically mounting a corresponding surge suppressor module; and
  a first alternating current surge suppressor circuit housed by said first housing, said circuit receiving said power and ground conductors through the opening of said first housing, said circuit including a first ground and electrically connecting said ground conductor to said first ground and to said plurality of means for electrically and mechanically mounting a corresponding surge suppressor module;
a second surge suppressor module comprising a second housing, a second surge suppressor circuit including a second ground, and a first means for electrical and mechanical connection to a first one of said means for electrically and mechanically mounting on a first one of said sides of the first housing of said first alternating current surge suppressor module, said second surge suppressor circuit electrically connecting said second ground to said first means for electrical and mechanical connection, in order that said second ground is electrically connected to said ground conductor through said first one of said means for electrically and mechanically mounting; and
a third surge suppressor module comprising a third housing, a third surge suppressor circuit including a third ground, and a second means for electrical and mechanical connection to a second one of said means for electrically and mechanically mounting on a second one of said sides of the first housing of said first alternating current surge suppressor module, said third surge suppressor circuit electrically connecting said third ground to said second means for electrical and mechanical connection, in order that said third ground is electrically connected to said ground conductor through said second one of said means for electrically and mechanically mounting,
wherein each of said first and second means for electrical and mechanical connection comprises: a first tongue, a channel parallel to said first tongue, said channel including a first ground bar electrically connected to a corresponding one of said second and third grounds, and a second tongue parallel to said channel; wherein said first alternating current surge suppressor module includes a pair of parallel grooves and a second ground bar; wherein said first and second tongues are adapted to be captured by said pair of parallel grooves of said first alternating current surge suppressor module; and wherein said first ground bar is adapted to electrically engage the second ground bar of said first alternating current surge suppressor module.

13. The modular surge suppressor system of claim 12 wherein said parallel grooves have a dovetail shape and are adapted to receive said first and second tongues, which have a corresponding dovetail shape; wherein said first ground bar of said channel has an arcuate shape; wherein said second ground bar of said first alternating current surge suppressor module has an arcuate shape, which is adapted to mechanically engage the arcuate shape of the first ground bar of said channel, in order to increase friction between a portion of the dovetail shape of said parallel grooves and a portion of the dovetail shape of said first and second tongues.

14. The modular surge suppressor system of claim 1 wherein at least one of said second and third housings includes a base having a plurality of ears adapted to mount a corresponding one of said second and third surge suppressor modules to a surface.

* * * * *